United States Patent
Kim et al.

(10) Patent No.: US 9,519,313 B2
(45) Date of Patent: Dec. 13, 2016

(54) ROLLABLE DISPLAY

(71) Applicant: Samsung Display Co., Ltd., Yongin, Gyeonggi-do (KR)

(72) Inventors: Younjoon Kim, Seoul (KR); Sangjo Lee, Hwaseong-si (KR); Junghun Lee, Hwaseong-si (KR); Jusuck Lee, Seoul (KR); Mi Jang, Suwon-si (KR); Kyungmin Choi, Seoul (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 15 days.

(21) Appl. No.: 14/717,793

(22) Filed: May 20, 2015

(65) Prior Publication Data

US 2016/0170450 A1    Jun. 16, 2016

(30) Foreign Application Priority Data

Dec. 16, 2014  (KR) .................. 10-2014-0181501

(51) Int. Cl.
*G06F 1/16*  (2006.01)

(52) U.S. Cl.
CPC ............. *G06F 1/1652* (2013.01); *G06F 1/166* (2013.01)

(58) Field of Classification Search
None
See application file for complete search history.

(56) References Cited

U.S. PATENT DOCUMENTS

| | | | |
|---|---|---|---|
| 6,249,377 B1* | 6/2001 | Takamoto | G03B 21/58 160/265 |
| 6,297,905 B1* | 10/2001 | Takamoto | G03B 21/58 359/443 |
| 6,466,369 B1* | 10/2002 | Maddock | G03B 21/30 348/E5.143 |
| 6,532,147 B1* | 3/2003 | Christ, Jr. | G06F 1/1615 248/917 |
| 6,771,232 B2* | 8/2004 | Fujieda | G06F 1/1615 345/30 |
| 7,559,163 B2* | 7/2009 | Ofuji | G03B 21/58 160/265 |

(Continued)

FOREIGN PATENT DOCUMENTS

| | | |
|---|---|---|
| KR | 10-2009-0006606 A | 1/2009 |
| KR | 10-2009-0023501 A | 3/2009 |

(Continued)

*Primary Examiner* — Xanthia C Cunningham
(74) *Attorney, Agent, or Firm* — Knobbe, Martens, Olson & Bear, LLP

(57) ABSTRACT

A rollable display is disclosed. In one aspect, the display includes a flexible display panel having first and second opposing ends and a jig connected to the first end of the flexible display panel. The flexible display panel is configured to be rolled around the jig. The display also includes a handle connected to the second end of the flexible display panel, a housing configured to accommodate the flexible display panel when rolled around the jig and a support unit connecting the handle to the housing. The support unit includes a frame guide having a track groove defined in a surface of the frame guide and a support frame. The support frame has a first end rotatably connected to one of the handle or the housing and a second end slidably connected to the track groove of the frame guide.

20 Claims, 19 Drawing Sheets

(56) References Cited

U.S. PATENT DOCUMENTS

| | | | | |
|---|---|---|---|---|
| 8,096,068 B2* | 1/2012 | Van Rens | G09F 9/35 | 40/514 |
| 8,184,369 B2* | 5/2012 | Kuroi | G03B 21/58 | 359/443 |
| 8,199,471 B2* | 6/2012 | Bemelmans | G09F 9/00 | 345/690 |
| 8,270,159 B2* | 9/2012 | Kao | H04M 1/0268 | 345/169 |
| 8,379,377 B2* | 2/2013 | Walters | G06F 1/1641 | 248/917 |
| 8,385,055 B2* | 2/2013 | Kao | G06F 1/1616 | 349/56 |
| 8,412,279 B2* | 4/2013 | Griffin | H04M 1/0235 | 379/428.01 |
| 8,711,566 B2* | 4/2014 | O'Brien | G06F 1/1624 | 361/724 |
| 9,098,241 B1* | 8/2015 | Cho | H05K 1/028 | |
| 9,158,332 B2* | 10/2015 | Vanska | G06F 1/16 | |
| 9,189,028 B2* | 11/2015 | Nakhimov | G06F 1/1652 | |
| 9,286,812 B2* | 3/2016 | Bohn | G09F 9/301 | |
| 2001/0010133 A1* | 8/2001 | Schoening | G09F 15/0025 | 40/518 |
| 2002/0070910 A1* | 6/2002 | Fujieda | G06F 1/1615 | 345/85 |
| 2002/0180709 A1* | 12/2002 | Lichtfuss | G06F 1/1626 | 345/173 |
| 2005/0176470 A1* | 8/2005 | Yamakawa | G09G 3/001 | 455/566 |
| 2006/0209406 A1* | 9/2006 | Choi | G03B 21/58 | 359/461 |
| 2007/0211036 A1* | 9/2007 | Perkins | G06F 1/1615 | 345/173 |
| 2007/0241002 A1* | 10/2007 | Wu | G06F 1/1601 | 206/150 |
| 2008/0086925 A1* | 4/2008 | Yang | H04M 1/0268 | 40/610 |
| 2008/0144265 A1* | 6/2008 | Aoki | G06F 1/1601 | 361/679.04 |
| 2009/0237872 A1* | 9/2009 | Bemelmans | G06F 1/1601 | 361/679.01 |
| 2010/0246113 A1* | 9/2010 | Visser | G06F 1/1601 | 361/679.3 |
| 2011/0188189 A1* | 8/2011 | Park | G05B 11/01 | 361/679.05 |
| 2011/0227855 A1* | 9/2011 | Kim | G02F 1/13306 | 345/173 |
| 2011/0305493 A1* | 12/2011 | Wu | G06F 3/041 | 400/472 |
| 2012/0044620 A1* | 2/2012 | Song | G06F 1/1616 | 361/679.01 |
| 2012/0050075 A1* | 3/2012 | Salmon | G06F 1/1626 | 341/20 |
| 2012/0243206 A1* | 9/2012 | Wang | G09F 9/30 | 362/97.1 |
| 2012/0314400 A1* | 12/2012 | Bohn | G09F 9/301 | 362/97.1 |
| 2013/0314762 A1* | 11/2013 | Kwack | G02F 1/09 | 359/280 |
| 2014/0247544 A1 | 9/2014 | Ryu | | |
| 2015/0062525 A1* | 3/2015 | Hirakata | G02F 1/133305 | 349/158 |
| 2015/0261259 A1* | 9/2015 | Endo | G06F 1/1652 | 361/679.06 |
| 2015/0373863 A1* | 12/2015 | Lin | A45C 11/00 | 206/774 |
| 2016/0034000 A1* | 2/2016 | Lee | G06F 1/1652 | 361/749 |
| 2016/0054758 A1* | 2/2016 | Han | G06F 1/1652 | 361/679.26 |
| 2016/0120022 A1* | 4/2016 | Lee | G06F 1/1652 | 361/749 |
| 2016/0187929 A1* | 6/2016 | Kim | G06F 1/1652 | 345/184 |

FOREIGN PATENT DOCUMENTS

| | | |
|---|---|---|
| KR | 10-2010-0017284 A | 2/2010 |
| KR | 10-2012-0014226 A | 2/2012 |
| KR | 10-2012-0014872 A | 2/2012 |

* cited by examiner

ROLLABLE DISPLAY

CROSS-REFERENCE TO RELATED APPLICATION

This application claims priority to and the benefit of Korean Patent Application No. 10-2014-0181501, filed on Dec. 16, 2014, with the Korean Intellectual Property Office, the disclosure of which is incorporated herein in its entirety by reference.

BACKGROUND

Field

The described technology generally relates to a display device, and more particularly, to a rollable display.

Description of the Related Technology

Rollable displays include a flexible display panel that can be rolled up for retraction into a housing and unrolled for use in a flat configuration. Due to the increase in portability and the ability of such a rollable displays to be made to conform to compact shapes, rollable displays are garnering attention as next generation displays.

However, since flexible display panels are continuously under stress when rolled up into a housing, flexible displays can be permanently deformed after being stored in the housing for a relatively long period of time. Accordingly, when the flexible display panel is unrolled, it may be difficult to return the display to a substantially flat state.

It is to be understood that this background of the related technology section is intended to provide a useful background for understanding the technology disclosed herein. As such, the background section may include ideas, concepts or recognitions that were not part of what was known or appreciated by those skilled in the pertinent art prior to a corresponding effective filing date of subject matter disclosed herein.

SUMMARY OF CERTAIN INVENTIVE ASPECTS

One inventive aspect is a display device having a flexible display panel that can be maintained to be substantially flat when the flexible display panel is unrolled.

Another aspect is a display device including a flexible display panel; a jig connected to one end of the flexible display panel and having an outer circumferential surface on which the flexible display panel is rolled therearound; a handle connected to the other end of the flexible display panel; a housing accommodating the flexible display panel rolled around the jig; and a support unit interposed between the handle and the housing, wherein the support unit includes: a frame guide having at least a track groove on at least a surface of the frame guide; and a support frame having one end rotatably coupled to the handle or the housing and the other end slidably coupled to the track groove of the frame guide to move therealong.

The support frame can include: a frame body having a fastening hole at one end thereof; an engaging portion inserted into the track groove to move therealong; and a connecting portion interposed between the frame body and the engaging portion.

The track groove can have a cross-sectional shape selected from the following: a circular shape, an elliptical shape, a dovetail shape, a truncated triangular shape, a rhombus shape, and a trapezoidal shape.

The engaging portion can have a cross-sectional shape that is substantially the same as that of the track groove.

The frame guide can further include a fixing groove provided in a direction non-parallel to the track groove.

The frame guide can include a first track groove provided on one surface thereof and a second track groove provided on the other surface thereof.

The support frame can include: a first support frame connecting the handle or the housing and the first track groove to one another; and a second support frame connecting the handle or the housing and the second track groove to one another, wherein the first and second support frames are interposed to be diagonal to one another.

The support frame can include: a first support frame connecting the handle and the first track groove to one another; a second support frame connecting the housing and the first track groove to one another; a third support frame connecting the handle and the second track groove to one another; and a fourth support frame connecting the housing and the second track groove to one another, wherein the first and second support frames are rotatably coupled to a common connecting portion, and the third and fourth support frames are rotatably coupled to a common connecting portion.

The frame guide can include first and second track grooves provided to be parallel to one surface of the frame guide and third and fourth track grooves provided to be parallel to the other surface of the frame guide.

The support frame can include: a first support frame connecting the handle and the first track groove to one another; a second support frame connecting the housing and the second track groove to one another; a third support frame connecting the handle and the third track groove to one another; and a fourth support frame connecting the housing and the fourth track groove to one another, wherein the first and second support frames are arranged to be diagonal to one another, and the third and fourth support frames are arranged to be diagonal to one another.

The first and second support frames can be arranged to have substantially the same height, and the third and fourth support frames can be arranged to have substantially the same height.

The first and second support frames can be arranged to be in the same direction, and the third and fourth support frames can be arranged to be in the same direction.

Another aspect is a display device including a flexible display panel; a jig connected to one end of the flexible display panel and having an outer circumferential surface on which the flexible display panel is rolled therearound; a handle connected to the other end of the flexible display panel; and a housing accommodating the flexible display panel rolled around the jig, wherein the handle includes at least a track groove provided on at least a surface of the handle, and at least a support frame rotatably coupled to the handle or the housing at one end of the support frame and slidably coupled to the track groove of the handle at the other end of the support frame.

The support frame can include: a frame body having a fastening hole at one end thereof; an engaging portion inserted into the track groove to move therealong; and a connecting portion interposed between the frame body and the engaging portion.

The track groove can have a cross-sectional shape selected from the following: a circular shape, an elliptical shape, a dovetail shape, a truncated triangular shape, a rhombus shape, and a trapezoidal shape.

The engaging portion can have a cross-sectional shape substantially the same as that of the track groove.

The frame guide can further include a fixing groove provided in a direction non-parallel to the track groove.

The handle can have first and second track grooves provided on a surface of the handle to be parallel to one another.

The support frame can include: a first support frame connecting the housing and the first track groove to one another; and a second support frame connecting the housing and the second track groove to one another, wherein the first and second support frames are arranged to have different heights from one another.

The housing can include an inlet through which the flexible display panel is drawn in or out.

Another aspect is a rollable display, comprising a flexible display panel having first and second opposing ends; a jig connected to the first end of the flexible display panel and having an outer circumferential surface, wherein the flexible display panel is configured to be rolled around the outer circumferential surface of the jig; a handle connected to the second end of the flexible display panel; a housing configured to accommodate the flexible display panel when rolled around the jig; and a support unit connecting the handle to the housing, wherein the support unit includes: a frame guide having a track groove defined in a surface of the frame guide; and a support frame having i) a first end rotatably connected to one of the handle or the housing and ii) a second end slidably connected to the track groove of the frame guide.

In exemplary embodiments, the support frame includes a frame body having a fastening hole defined in a first end thereof; an engaging portion configured to be inserted into the track groove of the frame guide; and a connecting portion connecting the engaging portion to a second end of the frame body. The track groove can have a cross-sectional shape selected from the following: a circular shape, an elliptical shape, a dovetail shape, a truncated triangular shape, a rhombus shape, and a trapezoidal shape. The engaging portion can have a cross-sectional shape that is substantially the same as that of the track groove. The frame guide can further include a fixing groove formed at one end of the track groove and extending in a direction so as to form an angle with the track groove.

In exemplary embodiments, the frame guide includes a first track groove defined in a first surface of the frame guide and a second track groove defined in a second surface of the frame guide opposing the first surface. The support frame can include a first support frame connecting the handle to the first track groove; and a second support frame connecting the housing to the second track groove, wherein the first and second support frames are respectively connected to the handle and the housing on opposing sides of the flexible display panel. The support frame can include a first support frame connecting the handle to the first track groove; a second support frame connecting the housing to the first track groove; a third support frame connecting the handle to the second track groove; a fourth support frame connecting the housing to the second track groove, wherein the first and second support frames are rotatably connected to a common connecting portion, and wherein the third and fourth support frames are rotatably connected to a common connecting portion.

In exemplary embodiments, the frame guide includes first and second track grooves defined in a first surface of the frame guide, wherein the first and second track grooves are substantially parallel to each other, wherein the frame guide further includes third and fourth track grooves defined in a second surface of the frame guide opposing the first surface, wherein the third and fourth track grooves are substantially parallel to each other. The support frame can include a first support frame connecting the handle to the first track groove; a second support frame connecting the housing to the second track groove; a third support frame connecting the handle to the third track groove; and a fourth support frame connecting the housing to the fourth track groove, wherein the first and second support frames are respectively connected to the handle and the housing on opposing sides of the flexible display, and wherein the third and fourth support frames are respectively connected to the handle and the housing on opposing sides of the flexible display.

In exemplary embodiments, the first and second support frames are arranged so as to have substantially the same height and wherein the third and fourth support frames are arranged so as to have substantially the same height. The first and second support frames can be respectively connected to the handle and the housing on the same side of the flexible display and the third and fourth support frames can be respectively connected to the handle and the housing on the same side of the flexible display.

Another aspect is a rollable display, comprising a flexible display panel having first and second ends opposing each other; a jig connected to the first end of the flexible display panel and having an outer circumferential surface, wherein the flexible display panel is configured to be rolled around the outer circumferential surface of the jig; a handle connected to the second end of the flexible display panel, wherein the handle includes a track groove defined in a surface of the handle; a housing configured to accommodate the flexible display panel when rolled around the jig; and a support frame having a first end rotatably connected to the housing and a second end slidably connected to the track groove of the handle.

In exemplary embodiments, the support frame includes a frame body having a fastening hole formed at a first end thereof; an engaging portion inserted into the track groove; and a connecting portion connecting the engaging portion to a second end of the frame body. The track groove can have a cross-sectional shape selected from the following: a circular shape, an elliptical shape, a dovetail shape, a truncated triangular shape, a rhombus shape, and a trapezoidal shape. The engaging portion can have a cross-sectional shape that is substantially the same as that of the track groove. The frame guide can further include a fixing groove formed at one end of the track groove and extending in a direction so as to form an angle with the track groove.

In exemplary embodiments, the handle has first and second track grooves defined in a surface of the handle, wherein the first and second track grooves are substantially parallel to one another. The support frame can include a first support frame connecting the housing to the first track groove; and a second support frame connecting the housing to the second track groove to one another, wherein the first and second support frames are arranged so as to have different heights from one another. The housing can include an inlet through which the flexible display panel is configured to be drawn in or out.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure will be more clearly understood from the following detailed description taken in conjunction with the accompanying drawings.

DETAILED DESCRIPTION OF CERTAIN INVENTIVE EMBODIMENTS

Figure 1:
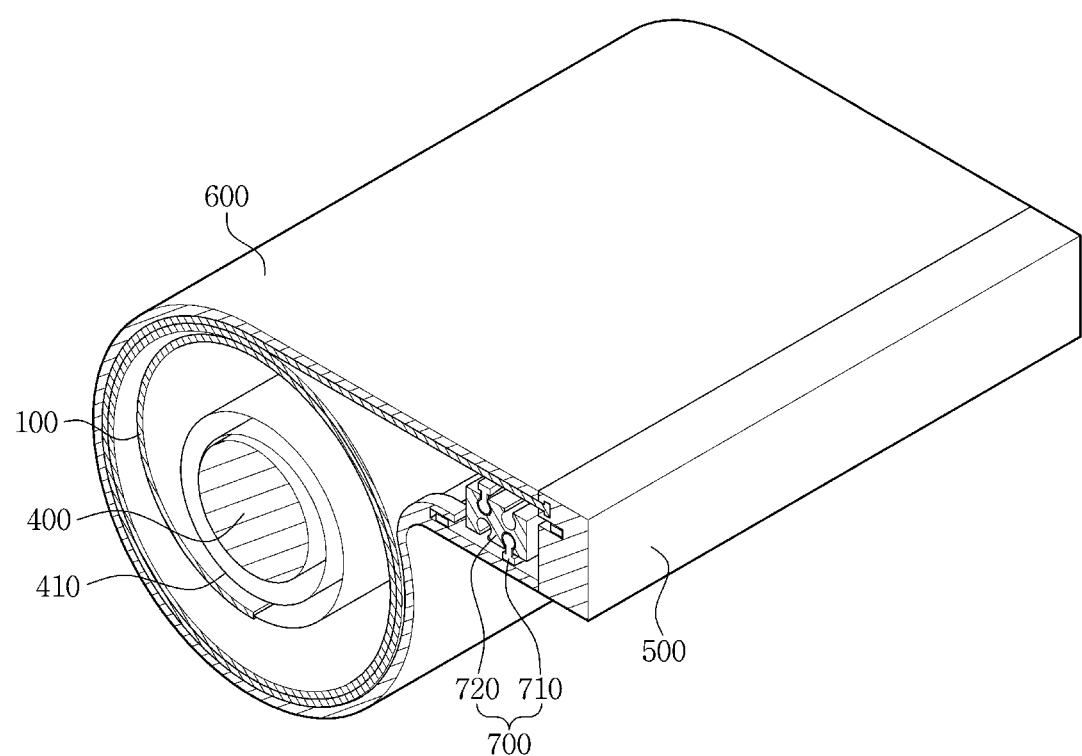
FIG. 1 is a schematic perspective view of a cross-section illustrating a flexible display panel accommodated in a display device according to a first exemplary embodiment.

Advantages and features of the described technology and methods for achieving the same will be made clear from the embodiments described in detail below with reference to the accompanying drawings. The described technology may, however, be embodied in many different forms and should not be construed as being limited to the embodiments set forth herein. Rather, these embodiments are provided so that this disclosure will be thorough and complete, and will fully convey the scope of the described technology to those skilled in the art. The described technology is merely defined by the scope of the claims. Therefore, well-known constituent elements, operations and techniques are not described in detail in the embodiments in order to prevent the described technology from being obscured. Like reference numerals refer to like elements throughout the specification.

Throughout the specification, when an element is referred to as being "connected" to another element, the element is either "directly connected" to the other element or "indirectly connected" to the other element with one or more intervening elements interposed therebetween. It will be further understood that the terms "comprises," "comprising," "includes" and/or "including," when used in this specification, specify the presence of the stated features, integers, steps, operations, elements, and/or components, but do not preclude the presence or addition of one or more other features, integers, steps, operations, elements, components, and/or groups thereof.

It will be understood that, although the terms "first", "second", and the like, may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of the exemplary embodiments.

Unless otherwise defined, all terms used herein (including technical and scientific terms) have the same meaning as commonly understood by those skilled in the art to which the described technology pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
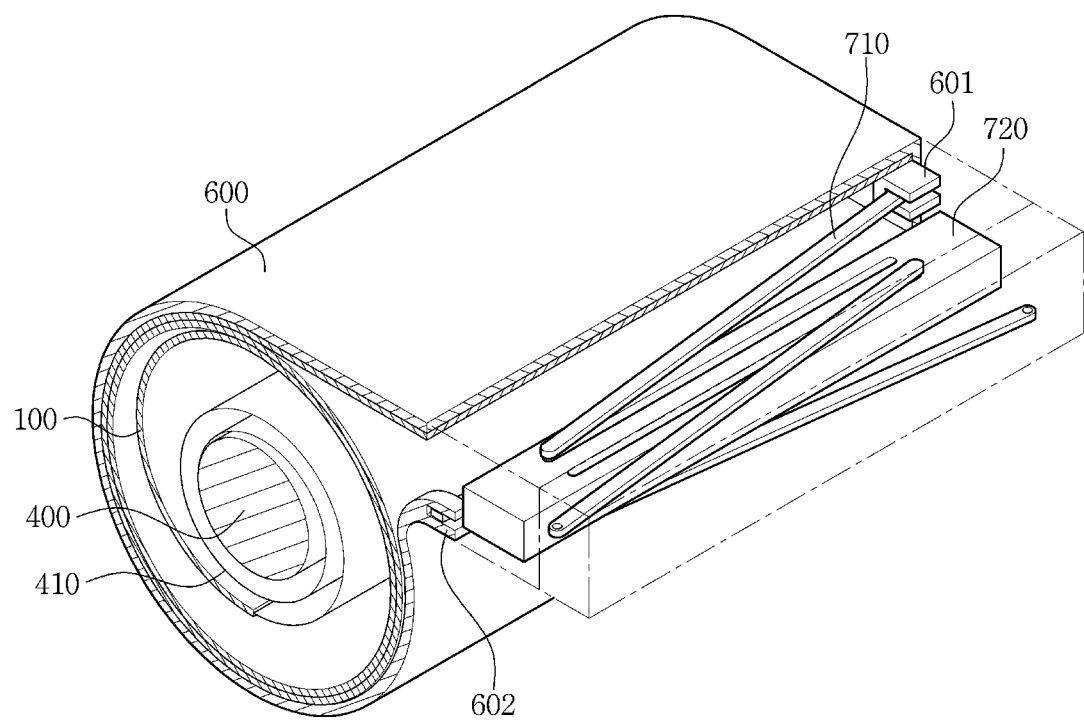
FIG. 2 is a schematic perspective view illustrating an example in which a flexible display panel is accommodated in a display device according to a first exemplary embodiment.
Figure 3:
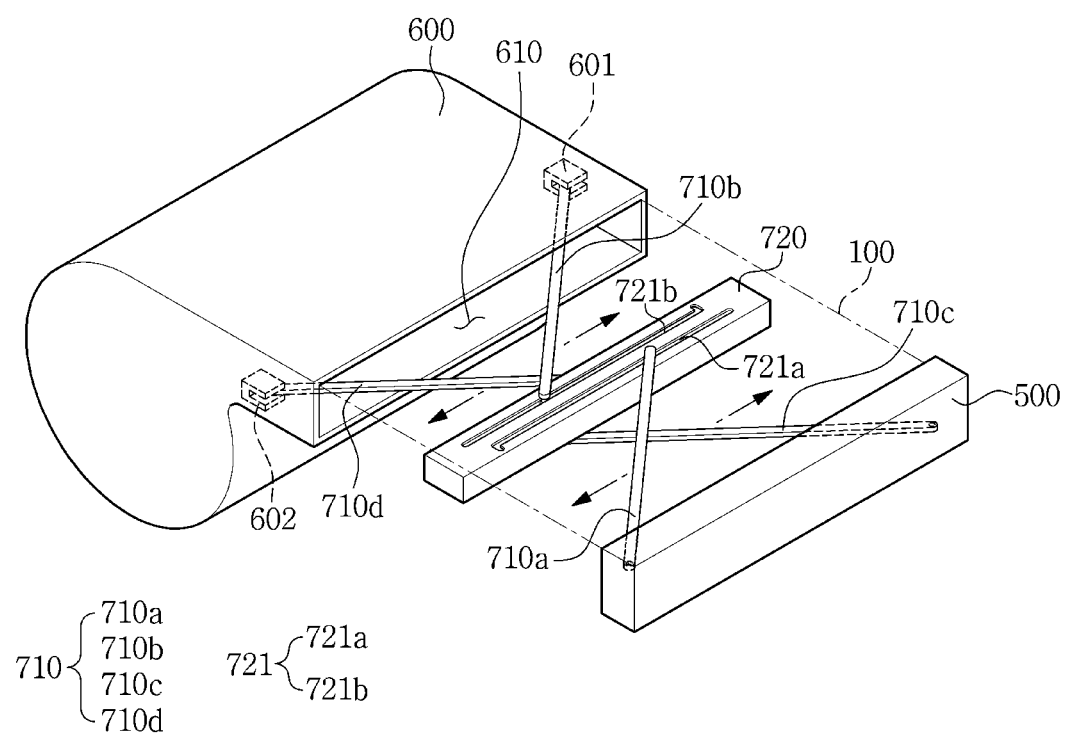
FIG. 3 is a schematic perspective view illustrating an example in which a flexible display panel of a display device is being unrolled according to a first exemplary embodiment.
Figure 4:
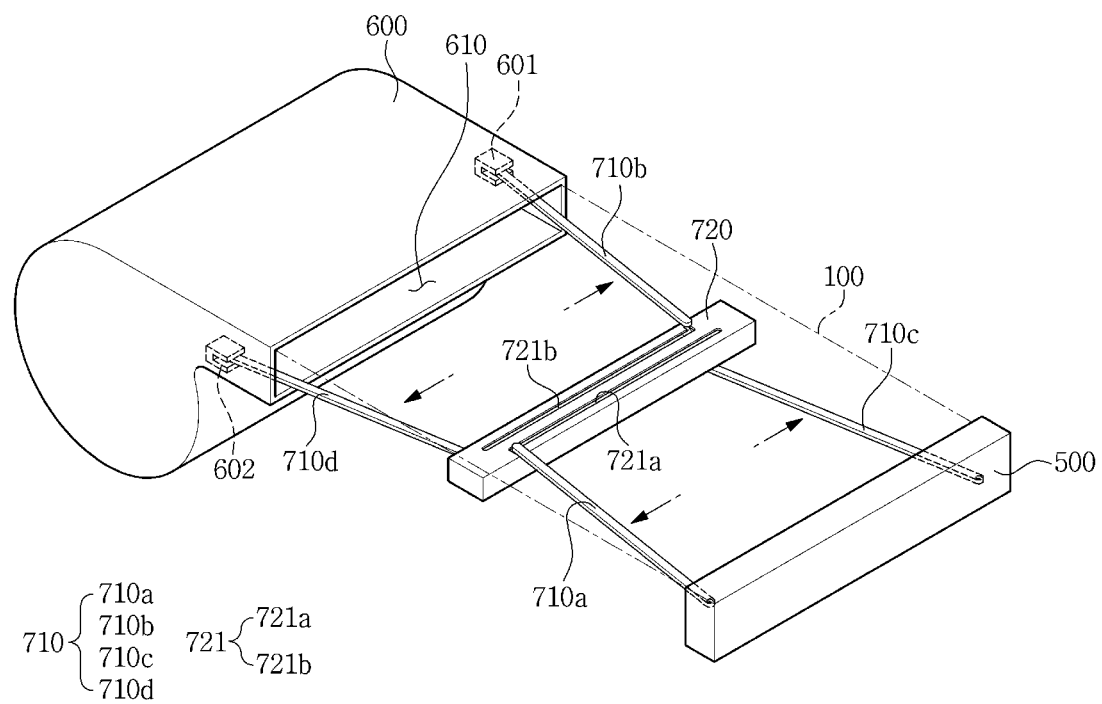
FIG. 4 is a schematic perspective view illustrating an example in which a flexible display panel of a display device is fully unrolled according to a first exemplary embodiment.
Figure 5:
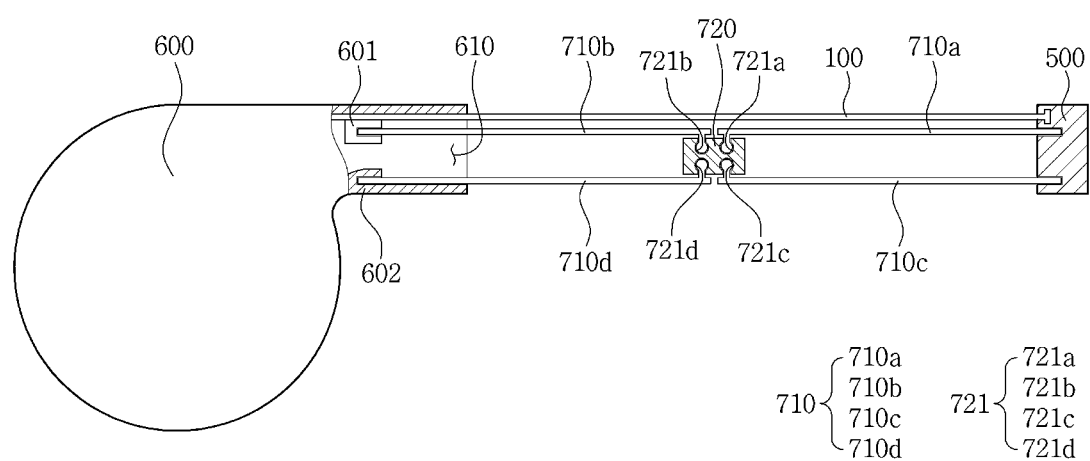
FIG. 5 is a schematic cross-sectional view illustrating an example in which a flexible display panel of a display device is fully unrolled according to a first exemplary embodiment.

FIGS. 1 and 2 are schematic perspective views illustrating an example in which a flexible display panel is accommodated in a display device according to a first exemplary embodiment. FIG. 3 is a schematic perspective view illustrating an example of a flexible display panel of a display device being unrolled according to a first exemplary embodiment. FIGS. 4 and 5 are schematic views illustrating an example of a flexible display panel of a display device that is fully unrolled according to a first exemplary embodiment.

Referring to FIGS. 1 through 5, the display device according to a first exemplary embodiment includes a flexible display panel 100, a jig 400 connected to one end of the flexible display panel 100 and having an outer circumferential surface on which the flexible display panel 100 can be rolled therearound or unrolled therefrom, a handle 500 connected to the other end of the flexible display panel 100, a housing 600 accommodating the flexible display panel 100 when rolled around the jig 400, and a support unit 700 connecting the handle 500 to the housing 600.

The flexible display panel 100 can be rolled around or unrolled from the outer circumferential surface of the jig 400. The flexible display panel 100 can include an organic light-emitting diode (OLED) display panel formed of a flexible plastic material or a liquid crystal display (LCD). A detailed configuration of the flexible display panel 100 will be described later.

One end of the flexible display panel 100 can be connected to the jig 400 through a wire spring 410. The flexible display panel 100 and the wire spring 410 may be rolled around or unrolled from the jig 400 in the same direction. The wire spring 410, which has a spiral shape, may provide resilience such that the flexible display panel 100 in the unrolled state is rolled back around the jig 400.

The handle 500 is connected to the other end of the flexible display panel 100. The handle 500 can provide a drawing force to allow the flexible display panel 100 rolled around the jig 400 to be unrolled therefrom. The handle 500 can be automatically drawn out directly by a user or using a motor, or the like.

The housing 600 can accommodate the flexible display panel 100 when the flexible display panel 100 is rolled around the jig 400. The housing 600 can have an interior having a substantially cylindrical shape; however, the shape of the housing is not limited thereto, and the housing 600 can have various shapes. In addition, the housing 600 has an inlet 610 through which the flexible display panel 100 unrolled from the jig 400 is drawn in or out from the housing 600. The handle 500 is connected to the inlet 610 of the housing 600 to thereby prevent the flexible display panel 100 from being entirely rolled into the interior of the housing 600.

In other words, when the flexible display panel 100 is unrolled from the jig 400, the flexible display panel 100 can be drawn out through the inlet 610. In addition, when the flexible display panel 100 is rolled around the jig 400, the flexible display panel 100 can be retracted into the housing 600 through the inlet 610.

Meanwhile, when the flexible display panel 100 is accommodated within the housing 600 for a relatively long period of time, the flexible display panel 100 may continuously receive stress in a predetermined direction, thereby deforming the flexible display panel 100. Accordingly, when the flexible display panel 100 is unrolled, the flexible display panel 100 may not remain in a substantially flat state.

The support unit 700 is interposed between the handle 500 and the housing 600. When the flexible display panel 100 is unrolled, the support unit 700 supports the flexible display panel 100 so as to maintain the flexible display panel 100 to be substantially flat. In addition, when the flexible display panel 100 is accommodated within the housing 600, the support unit 700 can also be accommodated within the housing 600 along with the flexible display panel 100.

In some embodiments, the support unit 700 includes a support frame 710 and a frame guide 720.

In the embodiment illustrated in FIGS. 1-5, one end of the support frame 710 is rotatably connected to the handle 500 or the housing 600. For example, one end of the support frame 710 can be connected to fixing portions 601 and 602 provided in the handle 500 or the housing 600 via a hinge-type connection.

The other end the support frame 710 can be slidably connected to a track groove 721 of the frame guide 720 to move therealong.

The frame guide 720 can have a body having a polygonal pillar shape, for example, a hexahedron having a rod shape elongated in the direction of the frame guide 720. The frame guide 720 can have at least a track groove 721 formed on at least a surface thereof. Although the frame guide 720 according to the first exemplary embodiment is illustrated as having the track grooves 721 formed on upper and lower surfaces thereof, respectively, the position(s) of the track groove(s) 721 are not limited thereto, and the track groove(s) 721 can be formed on a side surface of the frame guide 720. As used herein, a surface of the frame guide 720 facing the flexible display panel 100 will be referred to as the upper surface of the frame guide 720 and a surface of the frame guide 720 opposing the upper surface of the frame guide 720 will be referred to as the lower surface of the frame guide 720.

In the example of the display device according to the first exemplary embodiment, when the upper surface of the frame guide 720 includes first and second track grooves 721a and 721b formed thereon to be substantially parallel to one another and the lower surface of the frame guide 720 includes third and fourth track grooves 721c and 721d formed thereon to be substantially parallel to one another, the support frame 710 includes a first support frame 710a connecting the handle 500 and the first track groove 721a to one another, a second support frame 710b connecting the housing 600 and the second track groove 721b to one another, a third support frame 710c connecting the handle 500 and the third track groove 721c to one another, and a fourth support frame 710d connecting the housing 600 and the fourth track groove 721d to one another.

In the illustrated embodiment, when the flexible display panel 100 is unrolled, the first and second support frames 710a and 710b are arranged to be spaced apart from one another and the third and fourth support frames 710c and 710d are arranged to be spaced apart from one another.

In addition, the first and second support frames 710a and 710b can be arranged to have substantially the same height and the third and fourth support frames 710c and 710d can be arranged to have substantially the same height. Further, the arranged of the support frame 710 can be modified in various ways. Hereinafter, a configuration of the support frame 710 and the frame guide 720 will be described in greater detail.

Figure 6:
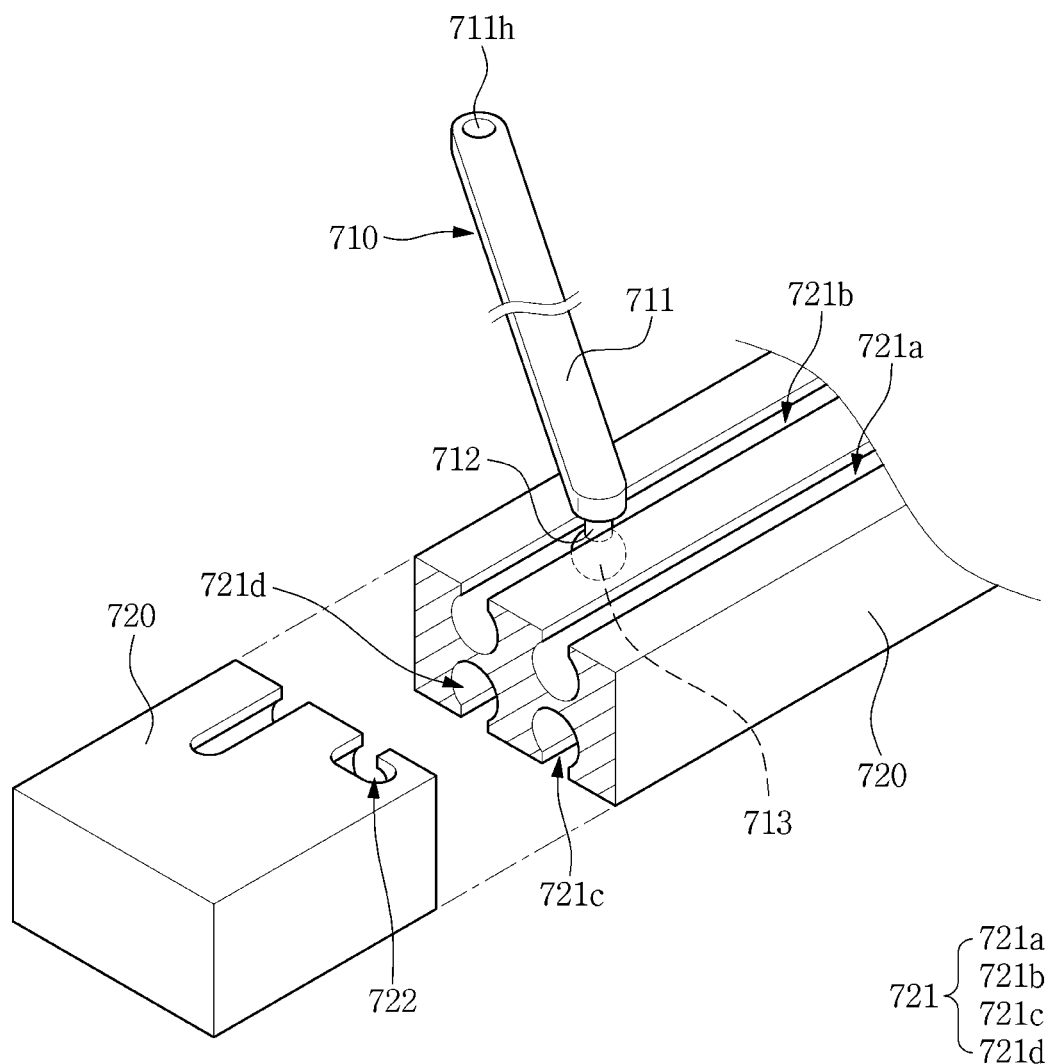
FIG. 6 is a schematic perspective view illustrating a support frame and a frame guide in a display device according to a first exemplary embodiment.

FIG. 6 is a schematic perspective view illustrating a support frame and a frame guide of a display device according to a first exemplary embodiment.

Referring to FIG. 6, the support frame 710 includes a frame body 711 having a fastening hole 711h at one end of the frame body 711, a connecting portion 712 extending from the other end of the frame body 711 to be substantially perpendicular to the frame body 711 and an engaging portion 713 extending from the connecting portion 712.

One end of the frame body 711 is rotatably connected to the handle 500 or the housing 600 using the fastening hole 711h. For example, one end of the support frame 710 can be connected to the handle 500 or the housing 600 using the fastening hole 711h via a hinge-type connection.

The other end of the frame body 711 is slidably connected to the track groove 721 of the frame guide 720 using the connecting portion 712 and the engaging portion 713. The engaging portion 713 is inserted into the track groove 721 formed in the frame guide 720 so as to slidably move along the track groove 721. The engaging portion 713 has a diameter that is greater than the width of the inlet of the track groove 721 such that the engaging portion 713 is not disengaged from the track groove 721.

The track groove 721 according to the first exemplary embodiment can have a circular cross-sectional shape or a circular cross-sectional shape having a truncated side. In addition, the track groove 721 can have a cross-sectional shape such as an elliptical shape, a dovetail shape, a truncated triangular shape, a rhombus shape, or a trapezoidal shape. Further, the engaging portion 713 can have a cross-sectional shape that is substantially the same as that of the track groove 721.

The frame guide 720 has a fixing groove 722 formed at an end of the track groove 721 in a direction that is not parallel to the track groove 721. The fixing groove 722 can be formed in the direction of the handle or the housing such that the support frame 710 can be fixed to the fixing groove 722 while slidably moving along the track groove 721; however, the formation of the fixing groove 722 is not limited thereto.

Figure 7:
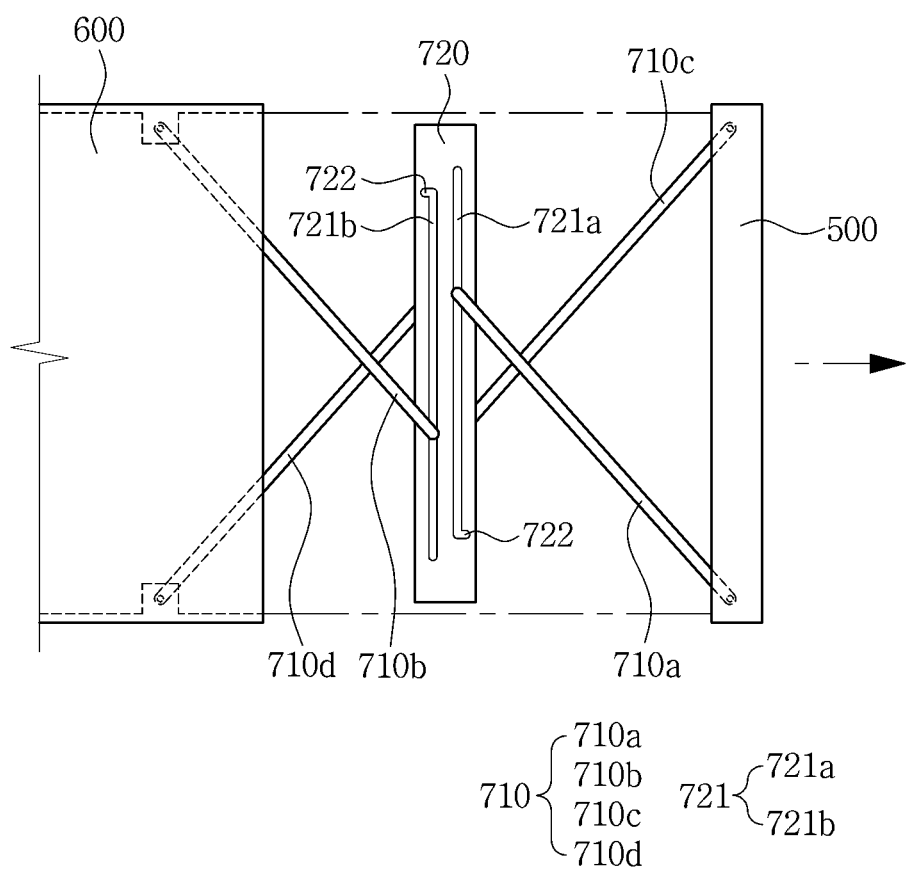
FIG. 7 is a schematic plan view illustrating an example in which a flexible display panel of a display device is being unrolled according to a first exemplary embodiment.
Figure 8:
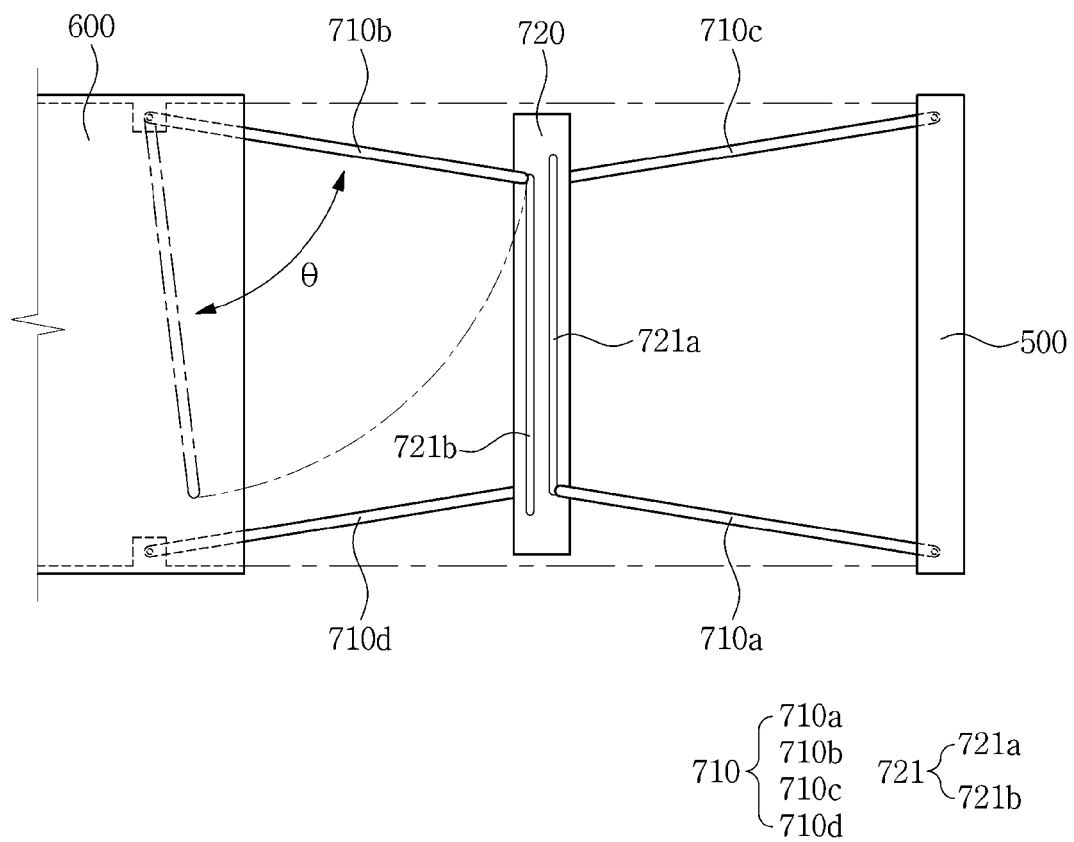
FIG. 8 is a schematic plan view illustrating an example in which a flexible display panel of a display device is fully unrolled according to a first exemplary embodiment.

FIG. 7 is a schematic plan view illustrating an example in which a flexible display panel of a display device is being unrolled according to a first exemplary embodiment. FIG. 8 is a schematic plan view illustrating an example in which a flexible display panel of a display device is fully unrolled according to a first exemplary embodiment.

Referring to FIGS. 7 and 8, when the handle 500 is drawn out from the housing 600 to unroll the flexible display panel 100, the support frame 710 can be spread out while slidably moving along the track groove 721 of the frame guide 720. When the support frame 710 moves to an end of the track groove 721, the support frame 710 can be fixed to the fixing groove 722 formed toward the handle 500 or the housing 600 due to tensile force of the handle 500.

Conversely, when the handle 500 is pushed toward the housing 600 to roll in the flexible display panel 100 to be accommodated in the housing 600, the support frame 710 can be disengaged from the fixing groove 722 to thereby return via a sliding movement along the track groove 721.

When the flexible display panel 100 is fully unrolled, the first support frame 710a and the fourth support frame 710d may not be parallel to one another. Similarly, the second support frame 710b and the third support frame 710d may not be parallel to one another.

In other words, each support frame 710 can have a range of a rotation angle θ of about 90 degrees or less. Since each support frame 710 does not rotate to a rotation angle greater than 90 degrees, when the handle 500 is pushed toward the housing 600 to roll in the flexible display panel 100 to be accommodated in the housing 600, the support frame 710 can be retracted to be accommodated therein.

Figure 9:
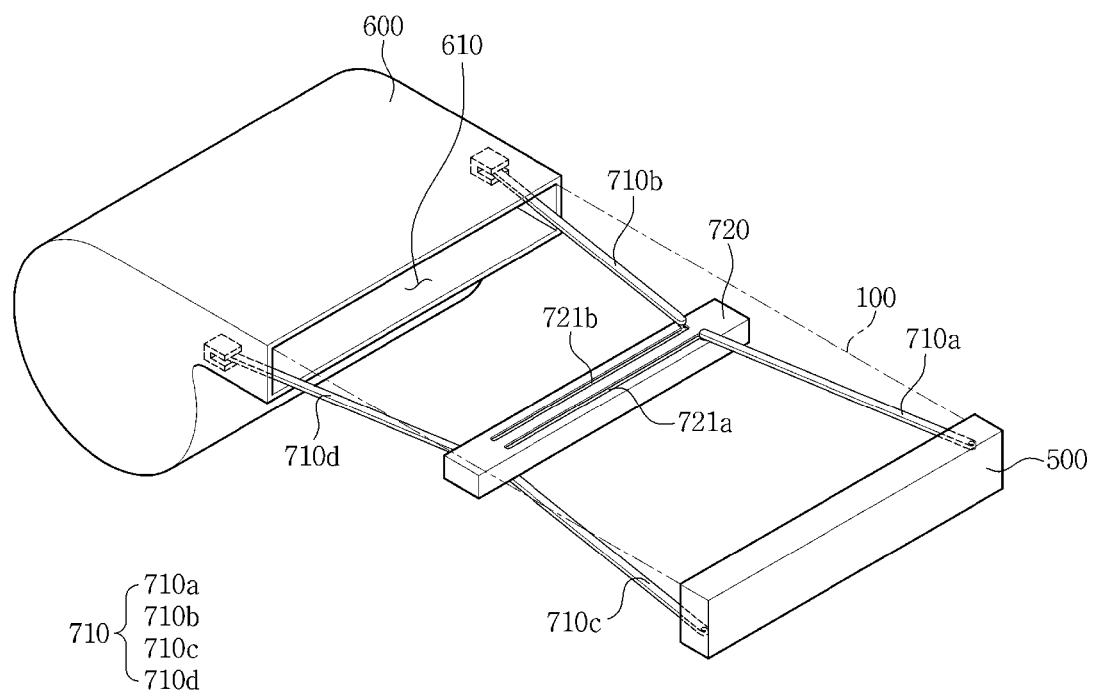
FIG. 9 is a schematic perspective view illustrating an example in which a flexible display panel of a display device is fully unrolled according to a second exemplary embodiment.

FIG. 9 is a schematic perspective view illustrating an example in which a flexible display panel of a display device is fully unrolled according to a second exemplary embodiment. A description of a display device according to a second exemplary embodiment including the same content as that of the display device according to the exemplary embodiment provided hereinbefore will be omitted for conciseness.

Referring to FIG. 9, a display device according to a second exemplary embodiment includes a flexible display panel 100, a jig (not illustrated) connected to one end of the flexible display panel 100 and having an outer circumferential surface on which the flexible display panel 100 is rolled therearound or unrolled therefrom, a handle 500 connected to the other end of the flexible display panel 100, and a housing 600 accommodating the flexible display panel 100 when rolled around the jig (not illustrated), and a support unit 700 interposed between the handle 500 and the housing 600. The support unit 700 includes a support frame 710 and a frame guide 720.

In the example of the display device according to the second exemplary embodiment, when an upper surface of the frame guide 720 includes first and second track grooves 721a and 721b formed thereon to be substantially parallel to one another, and a lower surface of the frame guide 720 includes a third track groove (not illustrated) and a fourth track groove (not illustrated) formed thereon to be substantially parallel to one another, the support frame 710 includes a first support frame 710a connecting the handle 500 and the first track groove 721a to one another, a second support frame 710b connecting the housing 600 and the second track groove 721b to one another, a third support frame 710c connecting the handle 500 and the third track groove to one another, and a fourth support frame 710d connecting the housing 600 and the fourth track groove to one another.

When the flexible display panel 100 is unrolled, the first and second support frames 710a and 710b are arranged in substantially the same direction as one another and the third and fourth support frames 710c and 710d are arranged in substantially the same direction as one another.

In addition, the first and second support frames 710a and 710b are arranged to have substantially the same height and the third and fourth support frames 710c and 710d are arranged to have substantially the same height.

Figure 10:
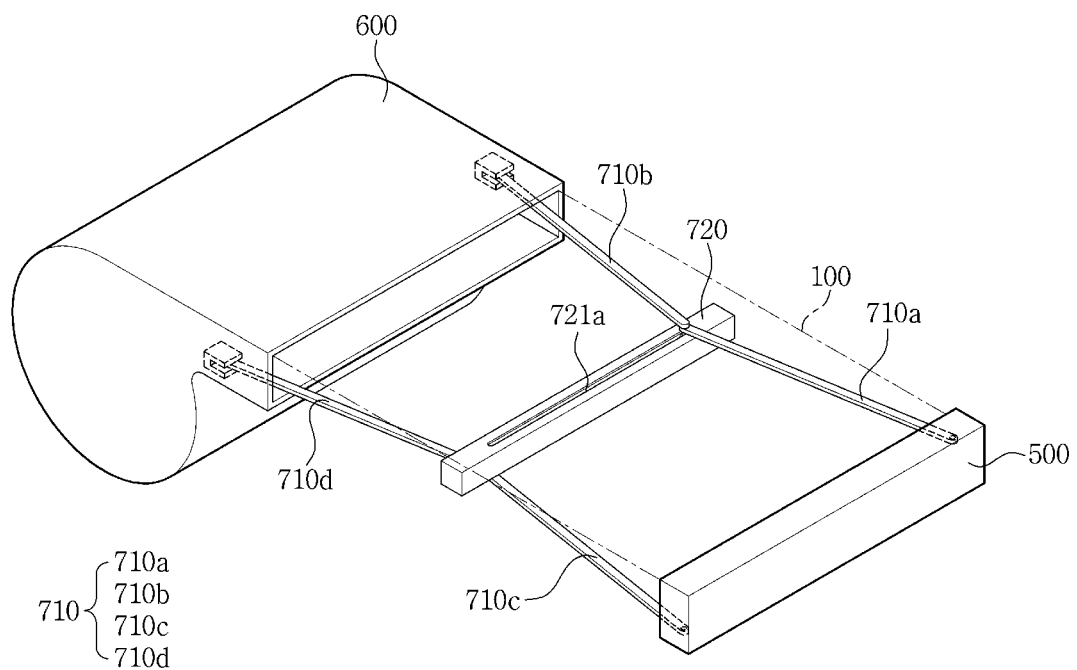
FIG. 10 is a schematic perspective view illustrating an example in which a flexible display panel of a display device is fully unrolled according to a third exemplary embodiment.
Figure 11:
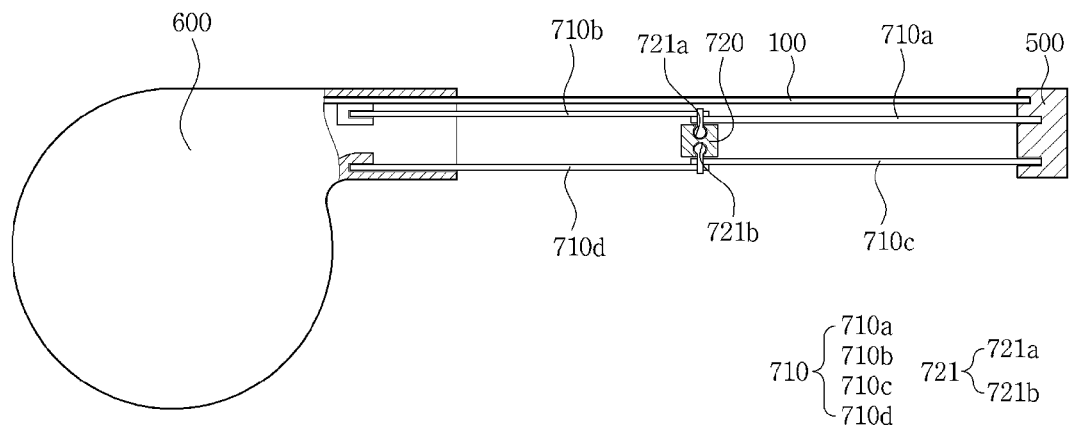
FIG. 11 is a schematic cross-sectional view illustrating an example in which a flexible display panel of a display device is fully unrolled according to a third exemplary embodiment.
Figure 12:
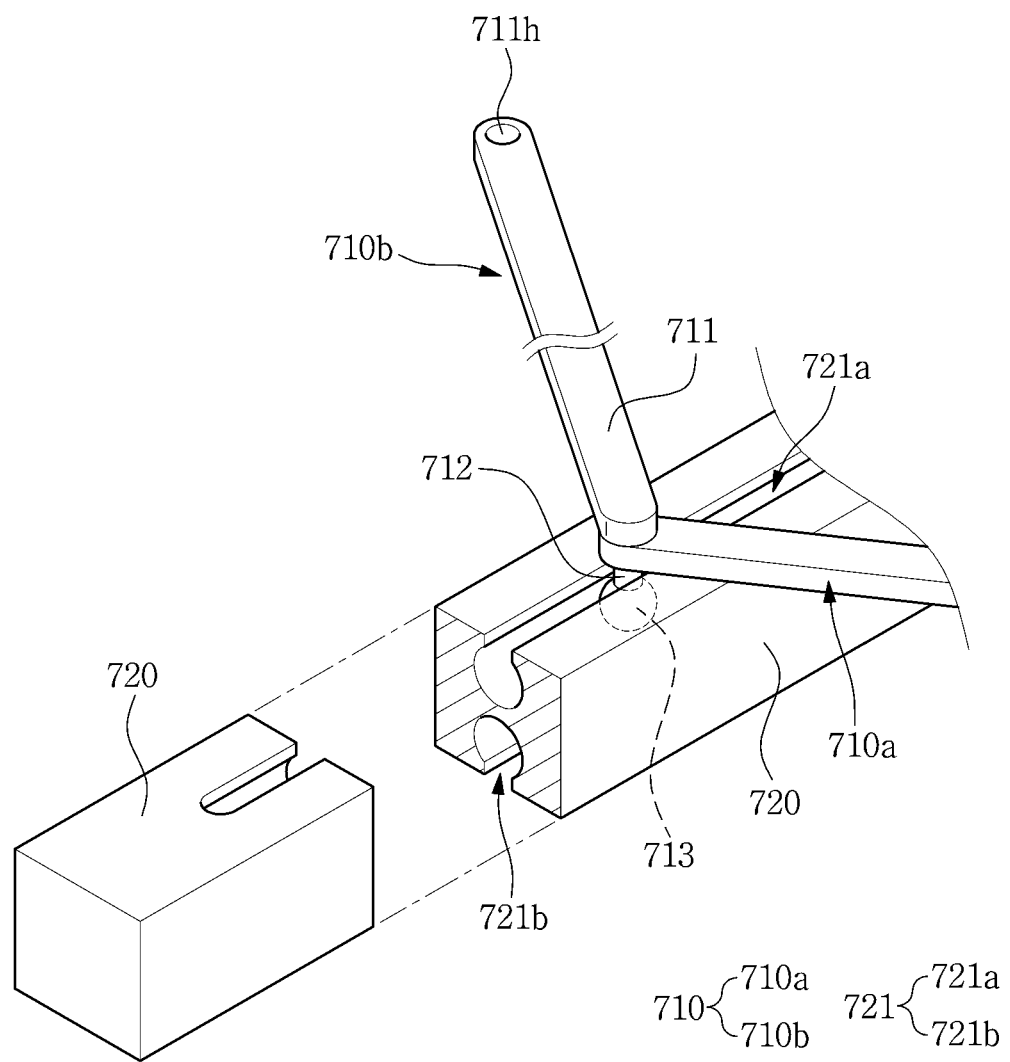
FIG. 12 is a schematic perspective view illustrating a support frame and a frame guide of a display device according to a third exemplary embodiment.

FIG. 10 is a schematic perspective view illustrating an example in which a flexible display panel of a display device is fully unrolled according to a third exemplary embodiment. FIG. 11 is a schematic cross-sectional view illustrating an example in which a flexible display panel of a display device is fully unrolled according to a third exemplary embodiment. FIG. 12 is a schematic perspective view illustrating a support frame and a frame guide of a display device according to a third exemplary embodiment. A description of a display device according to a third exemplary embodiment including the same content as that of the display device according to the first exemplary embodiment previously provided will be omitted for conciseness.

Referring to FIGS. 10 through 12, a display device according to a third exemplary embodiment includes a flexible display panel 100, a jig (not illustrated) connected to one end of the flexible display panel 100 and having an outer circumferential surface on which the flexible display panel 100 is rolled therearound or unrolled therefrom, a handle 500 connected to the other end of the flexible display panel 100, and a housing 600 accommodating the flexible display panel 100 when rolled around the jig (not illustrated), and a support unit 700 interposed between the handle 500 and the housing 600. The support unit 700 includes a support frame 710 and a frame guide 720.

In the example of the display device according to the third exemplary embodiment, when an upper surface of the frame guide 720 includes a first track groove 721a formed thereon and a lower surface of the frame guide 720 includes a second track groove 721b formed thereon, the support frame 710 includes a first support frame 710a connecting the handle 500 and the first track groove 721a to one another, a second support frame 710b connecting the housing 600 and the first track groove 721a to one another, a third support frame 710c connecting the handle 500 and the second track groove 721b to one another, and a fourth support frame 710d connecting the housing 600 and the second track groove 721b to one another.

The support frame 710 includes a frame body 711 having a fastening hole 711h at one end of the frame body 711, a connecting portion 712 extending from the other end of the frame body 711 to be substantially perpendicular to the frame body 711, and an engaging portion 713 extending from the connecting portion 712. One end of the support frame 710, for example, one end of each of the first, second, third, and fourth support frames 710a, 710b, 710c, and 710d, is rotatably connected to the handle 500 or the housing 600. The other end of each of the first and second support frames 710a and 710b, is rotatably connected to a common connecting portion 712 and the first and second support frames 710a and 710b can move along the first track groove 721a of the frame guide 720 with one another.

Similarly, the other end of each of the third and fourth support frames 710c and 710d, is rotatably connected to a common connecting portion 712 and can move along the second track groove 721b of the frame guide 720 with one another.

Figure 13:
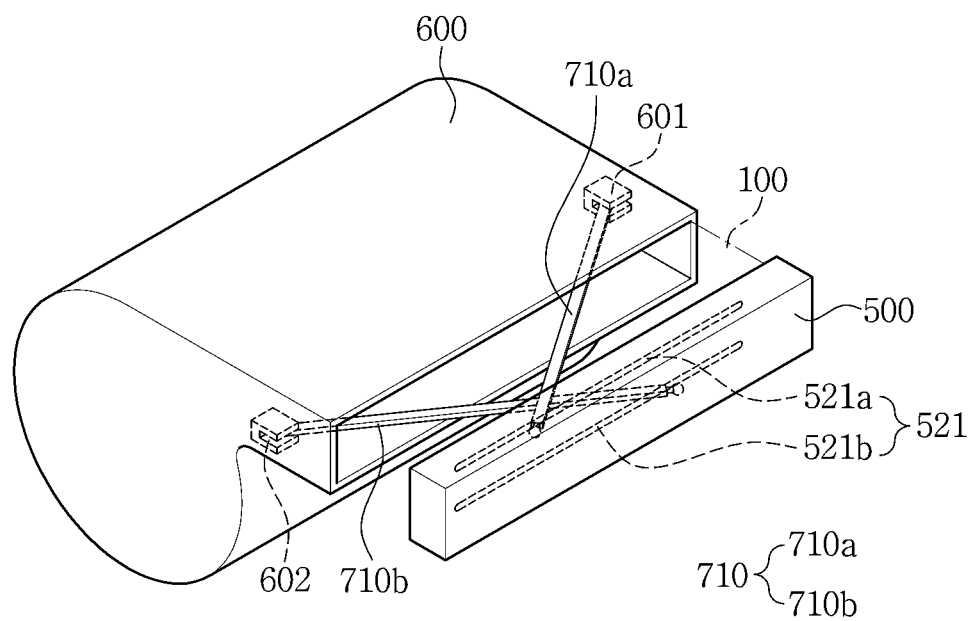
FIG. 13 is a schematic perspective view illustrating an example in which a flexible display panel of a display device is being unrolled according to a fourth exemplary embodiment.
Figure 14:
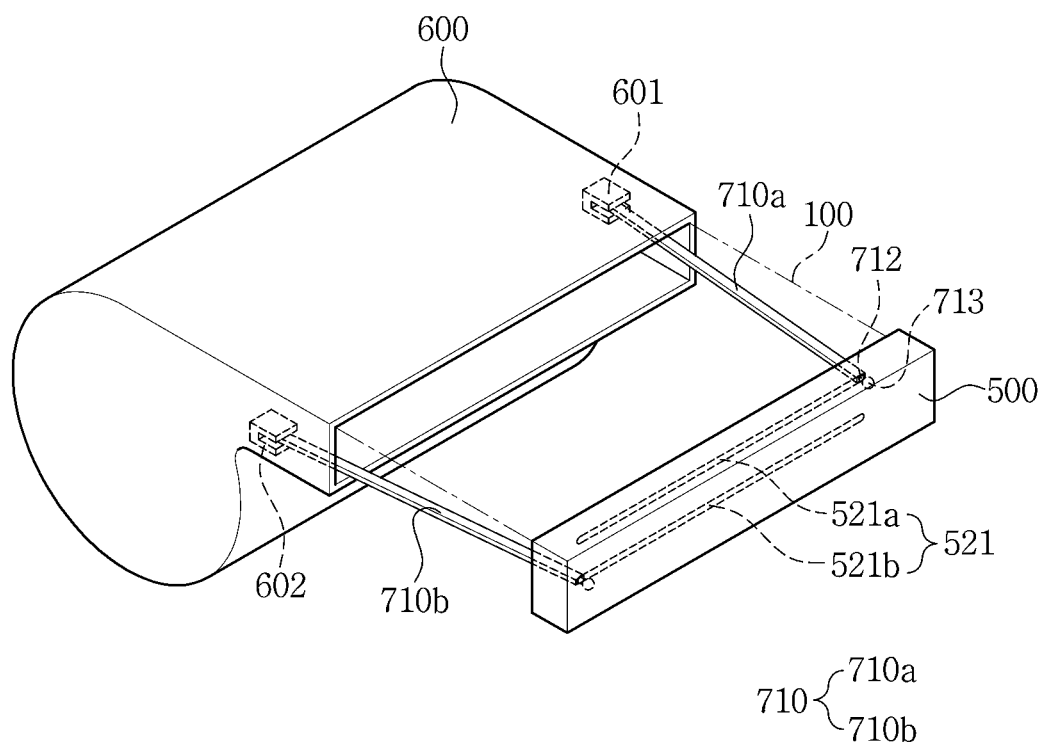
FIG. 14 is a schematic perspective view illustrating an example in which a flexible display panel of a display device is fully unrolled according to a fourth exemplary embodiment.
Figure 15:
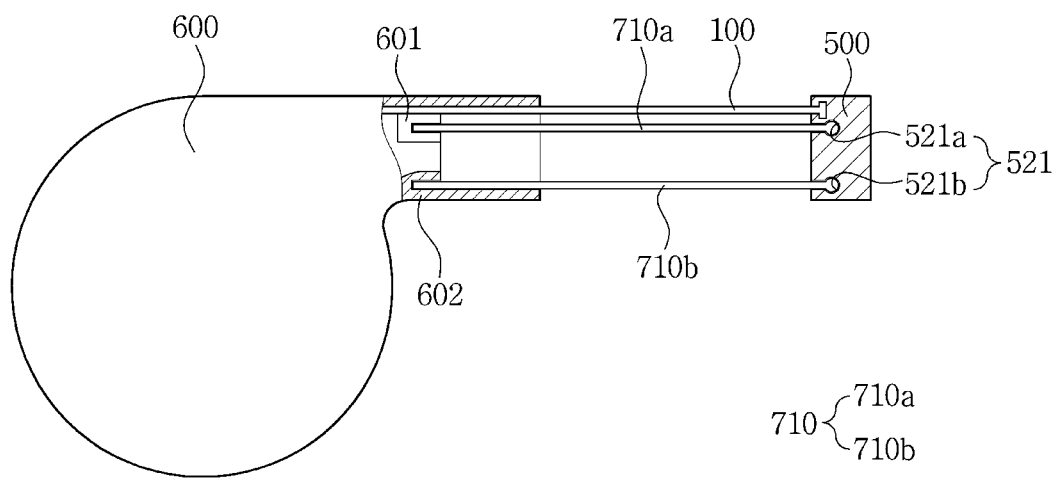
FIG. 15 is a schematic cross-sectional view illustrating an example in which a flexible display panel of a display device is fully unrolled according to a fourth exemplary embodiment.

FIG. 13 is a schematic perspective view illustrating an example in which a flexible display panel of a display device is being unrolled according to a fourth exemplary embodiment. FIG. 14 is a schematic perspective view illustrating an example in which a flexible display panel of a display device is fully unrolled according to a fourth exemplary embodiment. FIG. 15 is a schematic cross-sectional view illustrating an example in which a flexible display panel of a display device is fully unrolled according to a fourth exemplary embodiment. A description of a display device according to a fourth exemplary embodiment including the same content as that of the display device according to the first exemplary embodiment previously provided will be omitted for conciseness.

Referring to FIGS. 13 through 15, a display device according to a fourth exemplary embodiment includes a flexible display panel 100, a jig (not illustrated) connected to one end of the flexible display panel 100 and having an outer circumferential surface on which the flexible display panel 100 is rolled therearound or unrolled therefrom, a handle 500 connected to the other end of the flexible display panel 100, a housing 600 accommodating the flexible display panel 100 when rolled around the jig (not illustrated), and a support frame 710.

One end of the support frame 710 is rotatably connected to the housing 600. For example, one end of the support frame 710 is connected to fixing portions 601 and 602 provided in the housing 600 via a hinge-type connection. The support frame 710 includes a connecting portion 712 extending from the other end of the support frame 710 to be substantially parallel to the support frame 710, and an engaging portion 713 extending from the connecting portion 712. The other end of the support frame 710 is slidably connected to a track groove 521 of the handle 500 to move therealong.

In the example of the display device according to the fourth exemplary embodiment, when at least a surface of the handle 500 includes first and second track grooves 521a and 521b formed thereon to be substantially parallel to one another, the support frame 710 includes a first support frame 710a connecting the housing 600 and the first track groove 521a to one another and a second support frame 710b connecting the housing 600 and the second track groove 521b to one another.

When the flexible display panel 100 is unrolled, the first and second support frames 710a and 710b are arranged to be spaced apart from one another. In addition, the first and second support frames 710a and 710b can be arranged to have different heights from one another.

Figure 16:
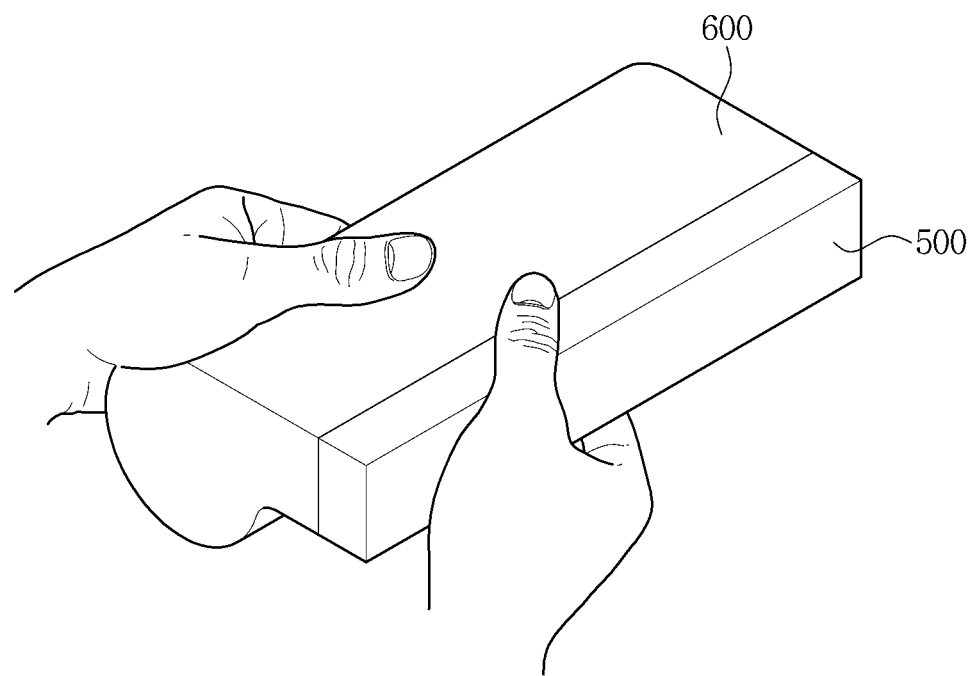
FIGS. 16 and 17 are schematic perspective views illustrating a sequential process in which a flexible display panel of a display device is unrolled according to a first exemplary embodiment.
Figure 17:
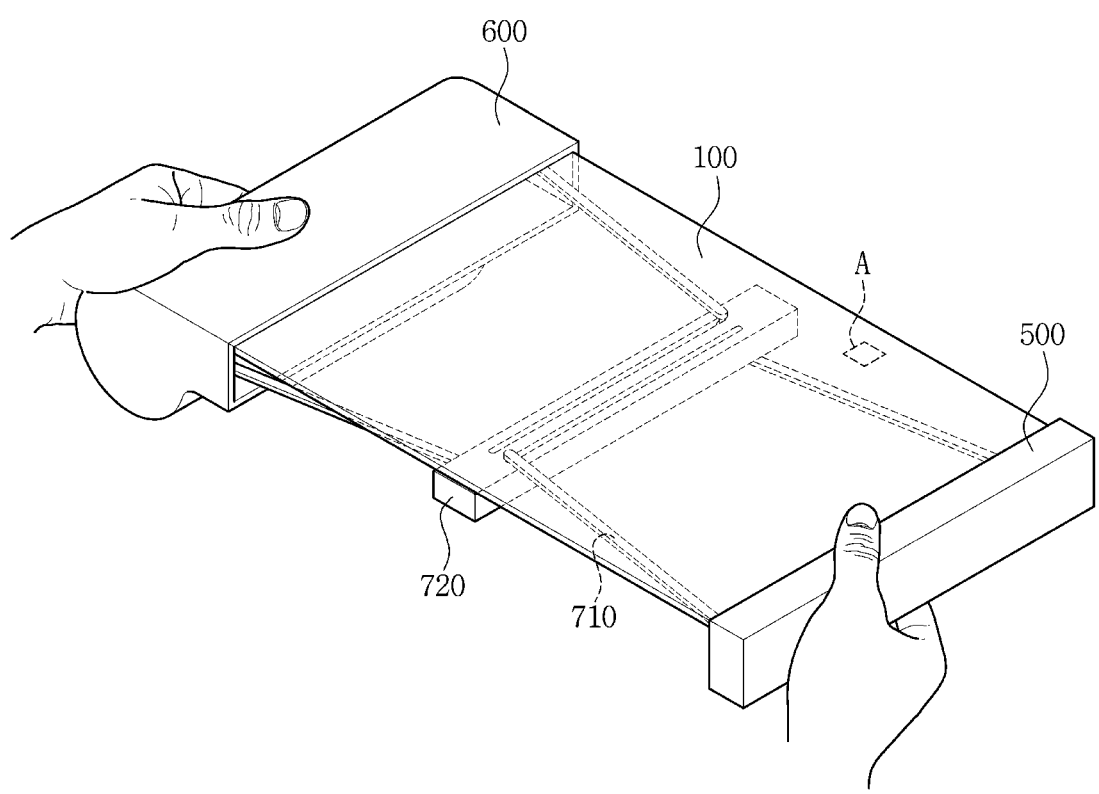
Figure 18:
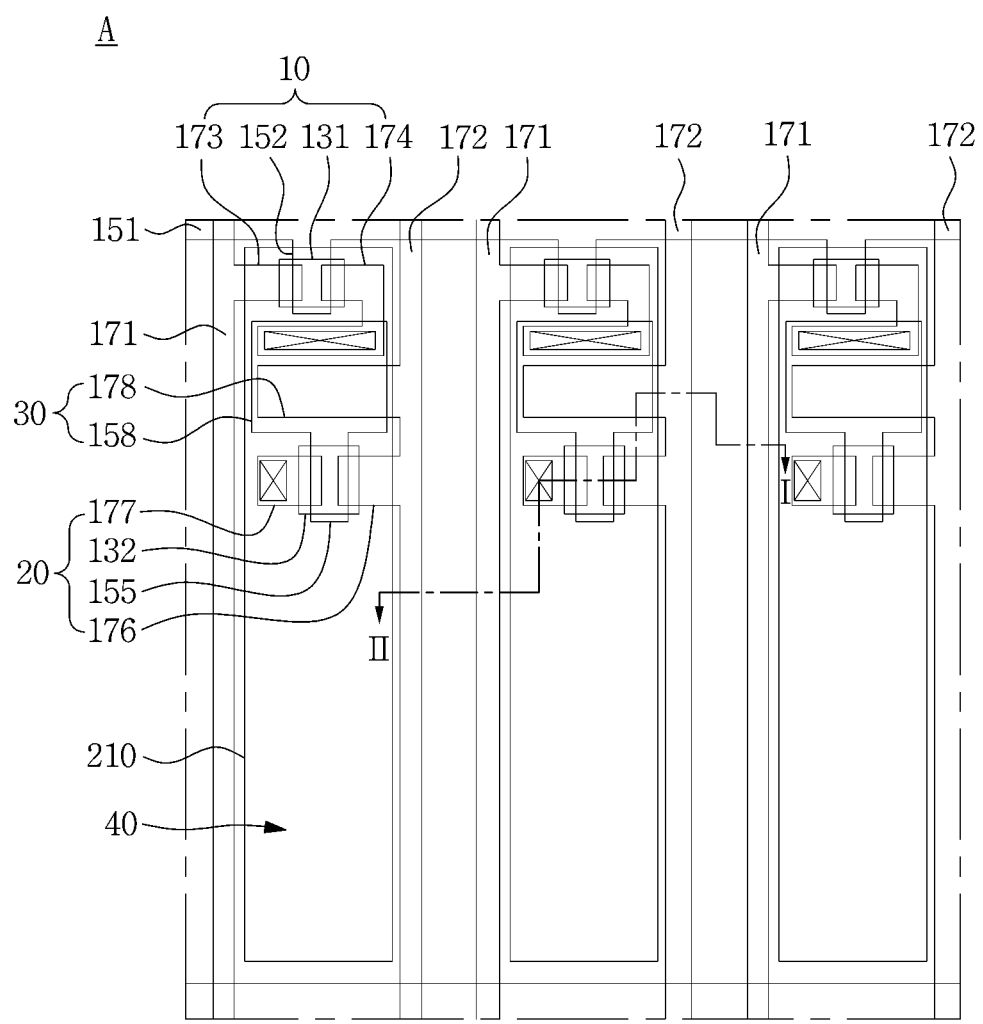
FIG. 18 is an enlarged view of portion "A" of FIG. 17.
Figure 19:
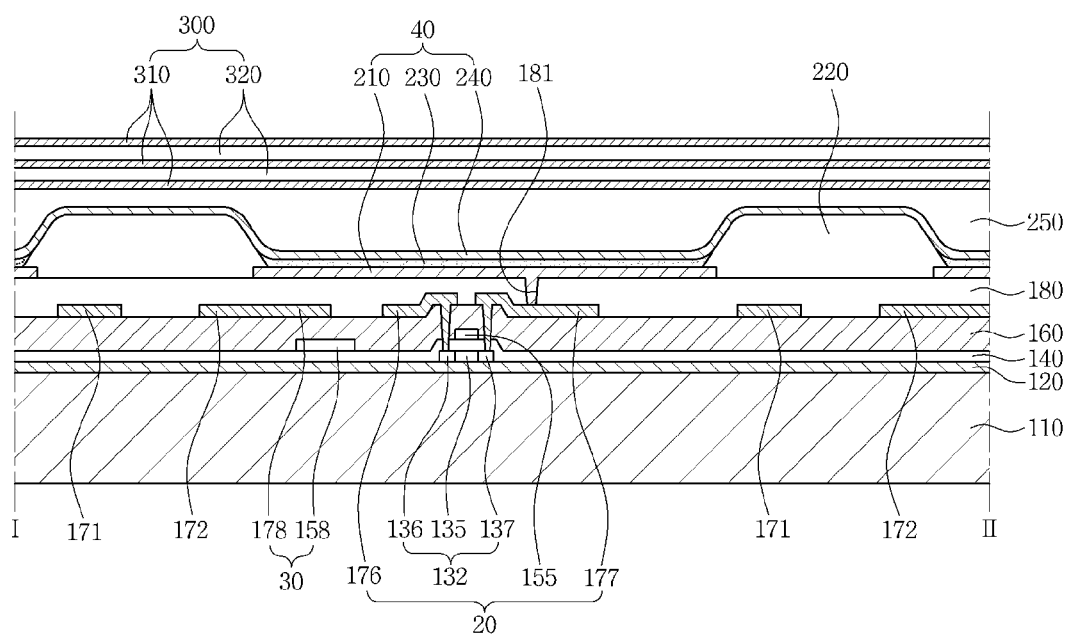
FIG. 19 is a cross-sectional view taken along line I-II of FIG. 18.

FIGS. 16 and 17 are schematic perspective views illustrating a sequential process in which a flexible display panel of a display device is unrolled according to a first exemplary embodiment. FIG. 18 is an enlarged view of portion "A" of FIG. 17. FIG. 19 is a cross-sectional view taken along line I-II of FIG. 18.

Referring to FIGS. 16 through 19, the flexible display panel 100 according to the first exemplary embodiment includes a switching thin film transistor (TFT) 10, a driving TFT 20, a power storage element 30, and an OLED element 40 formed on a flexible substrate 110.

The flexible substrate 110 can include at least one of Kapton, polyethersulphone (PES), polycarbonate (PC), polyimide (PI), polyethyleneterephthalate (PET), polyethylenenaphthalate (PEN), polyacrylate (PAR), and fiber reinforced plastic (FRP). In particular, PI, having high thermal resistivity, may be suitable for the material forming the flexible substrate 110, which may be subjected to high-temperature processes.

The flexible substrate 110 can have a thickness of from about 5 micrometers (μm) to about 200 μm. When the flexible substrate 110 has a thickness of less than about 5 μm, for example, the flexible substrate 110 may not stably support a driving circuit and a display element. On the other hand, when the flexible substrate 110 has a thickness of greater than about 200 μm, for example, the flexibility thereof may be reduced. In addition, the flexible substrate 110 can have a coefficient of thermal expansion (CTE) of from about 3 parts per million (ppm)/° C. to about 10 ppm/° C.

The flexible substrate 110 can include a buffer layer 120 formed thereon. The buffer layer 120 can prevent the infiltration of impure elements therethrough and planarize the surface of the flexible substrate 110. The buffer layer 120 can be formed of various types of materials capable of performing the aforementioned functions. For example, the buffer layer 120 can include one or more of the following materials: silicon nitride ($SiN_x$), silicon oxide ($SiO_2$), and silicon oxynitride ($SiO_xN_y$). The buffer layer 120 is not necessarily required, and thus can be omitted based on the type, the process conditions, and the like, of the flexible substrate 110.

A switching semiconductor layer 131 and a driving semiconductor layer 132 are formed over the buffer layer 120. The switching semiconductor layer 131 and the driving semiconductor layer 132 can be formed using one or more of the following materials: a polycrystalline silicon layer, an amorphous silicon layer, an oxide semiconductor such as indium-gallium-zinc oxide (IGZO) and indium-zinc-tin oxide (IZTO).

For example, when the driving semiconductor layer 132 is formed of a polycrystalline silicon layer, the driving semiconductor layer 132 can include a channel region 135 that is not doped with impurities and source and drain regions 136 and 137 that are doped with p-type materials and are formed at opposing sides of the channel region 135. The ions used for doping can be p-type impurities such as boron (B), and in particular, diborane ($B_2H_6$) can be used. Such impurities can differ based on the type of the TFT.

Although a p-type metal-oxide semiconductor (PMOS) TFT using p-type impurities is described as being used as the driving TFT 20 in the first exemplary embodiment, the type of the driving TFT 20 is not limited thereto. Accordingly, the driving TFT 20 can also use an n-type metal-oxide semiconductor (NMOS) TFT or a complementary metal-oxide semiconductor (CMOS) TFT.

The switching semiconductor layer 131 and the driving semiconductor layer 132 have a gate insulating layer 140 formed thereon. The gate insulating layer 140 can include at least one of tetraethyl orthosilicate (TEOS), $SiN_x$, and $SiO_2$. For example, the gate insulating layer 140 can have a double layer structure in which a $SiN_x$ layer having a thickness of about 40 nanometers (nm) and a TEOS layer having a thickness of about 80 nm are sequentially stacked.

A gate wiring is formed on the gate insluting layer 140 and the gate wiring includes gate electrodes 152 and 155. The gate wiring can further include a gate line 151, a first power storage plate 158, and other wiring(s). The gate electrodes 152 and 155 can be formed to overlap at least portions of the semiconductor layers 131 and 132, and in particular, the channel region 135.

The gate electrodes 152 and 155 can block impurities from being doped in the channel region 135 at the time of the doping impurities in the source and drain regions 136 and 137 of the semiconductor layers 131 and 132 during the formation of the semiconductor layers 131 and 132.

The gate electrodes 152 and 155 and the first power storage plate 158 can be formed on the same layer and can be formed of substantially the same metal. The gate electrodes 152 and 155 can include at least one of the following materials: molybdenum (Mo), chromium (Cr), and tungsten (W).

The gate insulating layer 140 can include an insulating interlayer 160 covering the gate electrodes 152 and 155. The insulating interlayer 160 can be formed of $SiN_x$, $SiO_x$, TEOS, or the like, in a manner similar to that of the gate insulating layer 140; however, the type of material forming the insulating interlayer 160 is not limited thereto.

A data wiring is formed over the insulating interlayer 160 and the data wiring can include source electrodes 173 and 176 and drain electrodes 174 and 177. The data wiring can further include a data line 171, a common power line 172, a second power storage plate 178, and other wiring(s). The source electrodes 173 and 176 can be connected to the source region 136 of the semiconductor layers 131 and 132 and the drain electrodes 174 and 177 can be connected to the drain region 137 of the semiconductor layers 131 and 132, through contact holes formed in the gate insulating layer 140 and the insulating interlayer 160.

A planarization layer 180 can be formed to cover the data line 171, the common power line 172, the source electrodes 173 and 176, the drain electrodes 174 and 177, and the second power storage plate 178 formed on the insulating interlayer 160. The planarization layer 180 can remove difference in the heights of the elements formed on the insulating interlayer 160 and can planarize the elements formed on the insulating interlayer 160 in order to enhance the light emission efficiency of the OLED element 40 to be formed on the planarization layer 180.

The planarization layer 180 can be formed of at least one of the following materials: a polyacrylate resin, an epoxy resin, a phenolic resin, a polyamide resin, a polyimide resin, an unsaturated polyester resin, a polyphenylenether resin, a polyphenylenesulfide resin, and benzocyclobutene (BCB).

As such, the switching TFT 10 can include the switching semiconductor layer 131, the gate electrode 152, for example, a switching gate electrode, the source electrode 173, for example, a switching source electrode, and the drain electrode 174, for example, a switching drain electrode. The driving TFT 20 can include the driving semiconductor layer 132, the gate electrode 155, for example, a driving gate electrode, the source electrode 176, for example, a driving source electrode, and the drain electrode 177, for example, a driving drain electrode.

The configuration of the switching and driving TFTs 10 and 20 is not limited to the aforementioned description and can be modified in various ways to include the configurations known in the art easily applicable by those skilled in the art. In addition, the power storage element 30 can include the first power storage plate 158 and the second power storage plate 178 formed to have the insulating interlayer 160 therebetween.

The insulating interlayer 160 can be a dielectric material and the power storage capacity of the power storage element 30 can be determined by the amount of electric charge accumulated in the power storage element 30 and the level of a voltage between the first and second power storage plates 158 and 178.

The switching TFT 10 can be used as a switching element selecting a pixel to emit light. The switching gate electrode 152 can be connected to the gate line 151. The switching source electrode 173 can be connected to the date line 171. The switching drain electrode 174 can be arranged to be spaced apart from the switching source electrode 173 and can be connected to the first power storage plate 158.

The driving TFT 20 can apply driving power to a pixel electrode 210 of the OLED element 40 to emit light within the selected pixel. The driving gate electrode 155 can be connected to the first power storage plate 158. The driving source electrode 176 and the second power storage plate 178 can be connected to the common power line 172. The driving drain electrode 177 can be connected to the pixel electrode 210 of the OLED element 40 through the contact hole of the driving drain electrode 177.

Due to such a structure, the switching TFT 10 can be operated by a gate voltage applied to the gate line 151 and to thereby transfer a data voltage applied to the data line 171 to the driving TFT 20.

A voltage that is substantially equal to the difference between the level of a common voltage applied from the common power line 172 to the driving TFT 20 and the level of the data voltage transferred from the switching TFT 10 can be stored in the power storage element 30. A current having a level substantially equal to the level of the voltage stored in the power storage element 30 can flow into the OLED element 40 through the driving TFT 20 and thereby the OLED element 40 can emit light.

The OLED 40 includes the pixel electrode 210, a light emitting layer 230 formed on the pixel electrode 210, and a common electrode 240 formed on the light emitting layer 230. At least a pixel electrode 210 can be formed in each pixel region.

The pixel electrode 210 of the OLED element 40 can be formed on the planarization layer 180. The pixel electrode 210 can be connected to the drain electrode 177 through a contact hole 181 formed in the planarization layer 180.

A pixel defining layer 220 defining the pixel region by exposing at least a portion of the pixel electrode 210 can be formed on the planarization layer 180. The pixel defining layer 220 can be formed of a resin such as a polyacrylate resin or a polyimide resin.

The light emitting layer 230 is formed on the pixel electrode 210 within the pixel region and the common electrode 240 is formed on the pixel defining layer 220 and the light emitting layer 230. The light emitting layer 230 can be formed of a low molecular weight organic material or a polymer organic material.

At least one of a hole injection layer (HIL) and a hole transporting layer (HTL) can further be interposed between the pixel electrode 210 and the light emitting layer 230 and at least one of an electron transporting layer (ETL) and an electron injection layer (EIL) can further be interposed between the light emitting layer 230 and the common electrode 240.

The pixel electrode 210 and the common electrode 240 can be formed using one of a transmissive electrode, a semi-transmissive electrode, and a reflective electrode.

The transmissive electrode can be formed of transparent conductive oxide (TCO). TCO can include at least one of the following materials: indium-tin oxide (ITO), indium-zinc oxide (IZO), antimony-zinc oxide (ATO), aluminum-zinc oxide (AZO), zinc oxide (ZnO), and a compound thereof.

The semi-transmissive and reflective electrodes can be formed of a metal such as magnesium (Mg), silver (Ag), gold (Au), calcium (Ca), lithium (Li), Cr, aluminum (Al), or copper (Cu), or an alloy thereof. Here, the type of electrode from among the semi-transmissive and reflective electrodes can be determined based on the thickness thereof.

In general, the semi-transmissive electrode can have a thickness of about 200 nm or less and the reflective electrode can have a thickness of about 300 nm or more. As the thickness of the semi-transmissive electrode decreases, the light transmissivity thereof can increase while the resistance thereof can increase. As the thickness of the semi-transmissive electrode increases, the light transmissivity thereof may decrease.

In addition, the semi-transmissive and reflective electrodes can have a multilayer structure including a metal layer formed of a metal or a metal alloy and a TCO layer stacked on the metal layer.

A capping layer 250 can be formed on the common electrode 240 in order to protect the OLED element 40 prior to forming a thin film encapsulation layer 300 and prevent damage to the OLED element 40 during the formation of the thin film encapsulation layer 300. The capping layer 250 can be formed of a single layer or two or more layers and can function as a barrier to moisture and/or oxygen. The capping layer 250 can be omitted and an organic layer 320 of the thin film encapsulation layer 300 can be formed in lieu of the capping layer 250.

The thin film encapsulation layer 300 can be formed on the capping layer 250. The thin film encapsulation layer 300 can include at least an inorganic layer 310 and at least an organic layer 320. In addition, the thin film encapsulation layer 300 can have a structure in which the inorganic layer 310 and the organic layer 320 are alternately stacked. In this instance, the inorganic layer 310 can be formed at a lowermost portion of the thin film encapsulation layer 300. The thin film encapsulation layer 300 can have a thickness of about 10 μm or less. The number of the inorganic layers 310 and the organic layers 320 is not limited to the example illustrated in FIG. 19.

The inorganic layer 310 can include at least one of aluminum oxide or silicon oxide. The organic layer 320 can include at least one of epoxy, acrylate, and urethane acrylate. The inorganic layer 310 can suppress moisture and oxygen from permeating toward the flexible display panel 100. The organic layer 320 can serve to mitigate stress within the inorganic layer 310 and fill minute cracks, pin holes, and the like, of the inorganic layer 310.

A touch screen panel (not illustrated) can be formed on the thin film encapsulation layer 300. The touch screen panel can detect the presence and position of a touch input. For example, a user can utilize the touch screen panel using a stylus pen, the user's finger, or the like. The touch screen panel can be formed of a transparent material.

As set forth above, according to at least one exemplary embodiment, the display device, which is rollable, can include the support unit that can maintain the flexible display panel to be substantially flat when unrolled.

From the foregoing, it will be appreciated that various embodiments in accordance with the inventive technology have been described herein for the purpose of illustration and that various modifications can be made without departing from the scope and spirit of the present teachings. Accordingly, the various embodiments disclosed herein are not intended to be limiting of the true scope and spirit of the present teachings. Various features of the above described and other embodiments can be mixed and matched in any manner to produce further embodiments consistent with the invention.

What is claimed is:

1. A rollable display, comprising:
   a flexible display panel having first and second opposing ends;
   a jig connected to the first end of the flexible display panel and having an outer circumferential surface, wherein the flexible display panel is configured to be rolled around the outer circumferential surface of the jig;
   a handle connected to the second end of the flexible display panel;
   a housing configured to accommodate the flexible display panel when rolled around the jig; and
   a support unit connecting the handle to the housing,
   wherein the support unit includes:
      a frame guide having a track groove defined in a surface of the frame guide; and
      a support frame having i) a first end rotatably connected to one of the handle or the housing and ii) a second end slidably connected to the track groove of the frame guide.

2. The display of claim 1, wherein the support frame includes:
   a frame body having a fastening hole defined in a first end thereof;
   an engaging portion configured to be inserted into the track groove of the frame guide; and
   a connecting portion connecting the engaging portion to a second end of the frame body.

3. The display of claim 2, wherein the track groove has a cross-sectional shape selected from the following: a circular shape, an elliptical shape, a dovetail shape, a truncated triangular shape, a rhombus shape, and a trapezoidal shape.

4. The display of claim 3, wherein the engaging portion has a cross-sectional shape that is substantially the same as that of the track groove.

5. The display of claim 2, wherein the frame guide further includes a fixing groove formed at one end of the track groove and extending in a direction so as to form an angle with the track groove.

6. The display of claim 1, wherein the frame guide includes a first track groove defined in a first surface of the frame guide and a second track groove defined in a second surface of the frame guide opposing the first surface.

7. The display of claim 6, wherein the support frame includes:
   a first support frame connecting the handle to the first track groove; and
   a second support frame connecting the housing to the second track groove, wherein the first and second support frames are respectively connected to the handle and the housing on opposing sides of the flexible display panel.

8. The display of claim 6, wherein the support frame includes:
a first support frame connecting the handle to the first track groove;
a second support frame connecting the housing to the first track groove;
a third support frame connecting the handle to the second track groove;
a fourth support frame connecting the housing to the second track groove,
wherein the first and second support frames are rotatably connected to a common connecting portion, and
wherein the third and fourth support frames are rotatably connected to a common connecting portion.

9. The display of claim 1, wherein the frame guide includes first and second track grooves defined in a first surface of the frame guide, wherein the first and second track grooves are substantially parallel to each other, wherein the frame guide further includes third and fourth track grooves defined in a second surface of the frame guide opposing the first surface, wherein the third and fourth track grooves are substantially parallel to each other.

10. The display of claim 9, wherein the support frame includes:
a first support frame connecting the handle to the first track groove;
a second support frame connecting the housing to the second track groove;
a third support frame connecting the handle to the third track groove; and
a fourth support frame connecting the housing to the fourth track groove,
wherein the first and second support frames are respectively connected to the handle and the housing on opposing sides of the flexible display, and
wherein the third and fourth support frames are respectively connected to the handle and the housing on opposing sides of the flexible display.

11. The display of claim 10, wherein the first and second support frames are arranged so as to have substantially the same height and wherein the third and fourth support frames are arranged so as to have substantially the same height.

12. The display of claim 6, wherein the first and second support frames are respectively connected to the handle and the housing on the same side of the flexible display and wherein the third and fourth support frames are respectively connected to the handle and the housing on the same side of the flexible display.

13. A rollable display, comprising:
a flexible display panel having first and second ends opposing each other;
a jig connected to the first end of the flexible display panel and having an outer circumferential surface, wherein the flexible display panel is configured to be rolled around the outer circumferential surface of the jig;
a handle connected to the second end of the flexible display panel, wherein the handle includes a track groove defined in a surface of the handle;
a housing configured to accommodate the flexible display panel when rolled around the jig; and
a support frame having a first end rotatably connected to the housing and a second end slidably connected to the track groove of the handle.

14. The display of claim 13, wherein the support frame includes:
a frame body having a fastening hole formed at a first end thereof;
an engaging portion inserted into the track groove; and
a connecting portion connecting the engaging portion to a second end of the frame body.

15. The display of claim 14, wherein the track groove has a cross-sectional shape selected from the following: a circular shape, an elliptical shape, a dovetail shape, a truncated triangular shape, a rhombus shape, and a trapezoidal shape.

16. The display of claim 14, wherein the engaging portion has a cross-sectional shape that is substantially the same as that of the track groove.

17. The display of claim 14, wherein the frame guide further includes a fixing groove formed at one end of the track groove and extending in a direction so as to form an angle with the track groove.

18. The display of claim 14, wherein the handle has first and second track grooves defined in a surface of the handle, wherein the first and second track grooves are substantially parallel to one another.

19. The display of claim 18, wherein the support frame includes:
a first support frame connecting the housing to the first track groove; and
a second support frame connecting the housing to the second track groove to one another,
wherein the first and second support frames are arranged so as to have different heights from one another.

20. The display of claim 1, wherein the housing includes an inlet through which the flexible display panel is configured to be drawn in or out.

* * * * *